United States Patent [19]
Herren et al.

[11] Patent Number: 6,113,683
[45] Date of Patent: Sep. 5, 2000

[54] COLORED PEARLESCENT PIGMENTS

[75] Inventors: Fritz Herren, Düdingen, Switzerland; Kimiya Takeshita, Hyogo, Japan; Michel François, Belfaux, Switzerland

[73] Assignee: Ciba Specialty Chemicals Corporation, Tarrytown, N.Y.

[21] Appl. No.: 09/188,938

[22] Filed: Nov. 10, 1998

[30] Foreign Application Priority Data

Nov. 25, 1997 [EP] European Pat. Off. ............ 97810909

[51] Int. Cl.$^7$ ............ C09B 67/10; C09B 67/14; C09B 67/20

[52] U.S. Cl. ............ 106/494; 106/410; 106/413; 106/417; 106/447; 106/493; 106/495; 106/496; 106/497; 106/498; 106/499

[58] Field of Search ............ 106/494, 495, 106/496, 497, 498, 410, 413, 417, 447, 493, 499

[56] References Cited

U.S. PATENT DOCUMENTS

| | | | |
|---|---|---|---|
| 3,647,492 | 3/1972 | Chapman et al. | 106/291 |
| 5,037,475 | 8/1991 | Chida et al. | 106/403 |
| 5,061,317 | 10/1991 | Korpi et al. | 106/417 |

FOREIGN PATENT DOCUMENTS

| | | |
|---|---|---|
| 0220617 | 5/1987 | European Pat. Off. . |
| 0278633 | 8/1988 | European Pat. Off. . |
| 0554776 | 8/1993 | European Pat. Off. . |
| 4009567 | 9/1991 | Germany . |
| 4225031 | 2/1994 | Germany . |
| 4225357 | 2/1994 | Germany . |
| 2055879 | 3/1981 | United Kingdom . |
| 96/22336 | 7/1996 | WIPO . |

OTHER PUBLICATIONS

Derwent Abst. 83–01025K of JP 57 188 435 (Nov. 1982).
Derwent Abst. 87–113238 of JP 62 059 673 (Mar. 1987).
Derwent Abstr. 96–354502 [35] for PCT/World 96/22336 (Jul. 1996).
Derwent Abstr. 94–043831 [06] for DE 4225357 (Feb. 1994).
Derwent Abstr. 91–289058 [40] for DE 4009567 (Sep. 1991).
Abstr. prepared by UK Patent Office for DE 4225031 (Feb. 1994).

*Primary Examiner*—Anthony Green
*Attorney, Agent, or Firm*—David R. Crichton

[57] ABSTRACT

Colored pearlescent pigment comprising a pearlescent pigment and a second pigment, characterized in using an adhesion promotor for the mutual adsorbance of the pearlescent pigment and the second pigment, whereby the adhesion promotor is a polymer containing hydroxy groups, a process for its preparation, its use and a colored high molecular weight material.

10 Claims, No Drawings

COLORED PEARLESCENT PIGMENTS

The present invention relates to a colored pearlescent pigment comprising a pearlescent pigment and a second pigment, characterized in using an adhesion promotor for the mutual adsorbance of the pearlescent pigment with the second pigment, whereby the adhesion promotor is a polymer containing hydroxy groups.

Pigment compositions comprising a pigment and a substrate are well-known in the art. DE-A 42 25 031 e.g. describes platelets which are coated with organic pigments. The disclosed method shows several disadvantages: the use of solvent soluble organic pigments, the use of at least two solvents (costs, additional process step, huge volumina, separation), the particle size cannot be controlled when precipitating the dye onto the platelet surface, the amount of adsorbed dye on the platelet is not sufficient with regard to certain applications.

DE-A 40 09 567 describes interference pigments coated with phthalocyanine dyes, wherein no adhesion promotor is used. The interference pigments are prepared by dissolving the phthalocyanine dye, e.g. in concentrated sulfuric acid, and mixing this solution with a suspension of a substrate in the presence of a solvent in which the dye is insoluble. The use of concentrated sulfuric acid as well as the insufficient adhesion between substrate and dye are unfavorable.

DE-A 42 25 357 describes platelike substrates which are coated with externally basic organic colorants. The disclosed method shows several disadvantages: only acid-soluble pigments can be used, the used acid has to be neutralized (which is an additional process step, economically not desired, and the disposal of such neutralized acids lead nowadays to ecological problems), the dye has to carry a basic substituent, the particle size can not be controlled when precipitating the dye onto the platelet surface, the amount of adsorbed dye on the platelet is not sufficient with regard to certain applications.

EP-A 554 776 describes flaky pigments in the form of composite particles which are formed by subjecting a mixture composed of a flaky substrate comprising flaky substrates and a pigment and/or a dye comprising particles to high-speed stirring treatment in the absence of a liquid medium. However, no strong adhesion between substrate and pigment is obtained.

EP-A 278 633 describes the preparation of colored pigments based on mica, wherein a polymer comprising anionic groups is precipitated in the presence of mica and a organic pigment by the addition of a cationic polyvalent metal. There is the disadvantage of not obtaining high enough concentrations of organic pigment and consequent lack of color intensity.

U.S. Pat. No. 5,061,317 describes dyestuff or pigment containing nacreous pigments, which are prepared by leaching siliceous material to obtain a porous structure which is then dyed. This process is complicated, uses concentrated strong mineral acids, and can mainly be used with dyestuffs, resulting in an insufficient pigment stability.

U.S. Pat. No. 5,037,475 describes a colored metallic pigment comprising a metallic pigment, a coloring pigment, and a thermally polymerized carboxylic acid having at least one double bond and at least two carboxylic groups prepared by the thermal polymerization of at least one double bond-containing carboxylic acid, the coloring pigment being chemically adsorbed on the surface of the metallic pigment via the thermally polymerized carboxylic acid. The main disadvantages are the imperfect adhesion between coloring pigment and metallic pigment, and that the thickness of the polymer layer between metallic pigment and coloring pigment is not controllable.

GB-A 2,055,879 describes a colored material containing lustrous pigments based on mica flakes coated with metal oxide, which, as colored material, contain a colored aluminum lake which is fixed as a water-insoluble compound on the surface of the pigment particles with the help of a precipitated aluminum hydroxide layer, wherein the aluminum hydroxide layer contains a compound having a molecular weight of at least 150, and said compound being precipitated together with the aluminum hydroxide layer. Because of the simultaneous co-precipitation of an aluminum hydroxide layer and a compound having a molecular weight of at least 150, those compounds are not easy to prepare industrially. Their use is limited to cosmetics, where it is not necessary to produce large volumes. Further, the additional use of an aluminum hydroxide layer is not preferred, because of additional costs and efforts. In addition, as dyestuff only diazotised amines can be used which are able to react with the aluminum compound to form a water-insoluble colored aluminum lake.

Hence, the object of the invention on hand was to provide a colored pearlescent pigment which does not show the abovementioned drawbacks. Especially, a process should be provided which is not complicated, rather easy to handle in a commercial process. Further, the adhesion between a pearlescent pigment and a second pigment and the color intensity with regard to corresponding prior art pigment should be improved.

Accordingly, a colored pearlescent pigment comprising a pearlescent pigment and a second pigment was found, using an adhesion promotor for the mutual adsorbance of the pearlescent pigment and the second pigment, whereby the adhesion promotor is a polymer containing hydroxy groups.

Further, a process for its preparation, its use and a colored high molecular weight material comprising the inventive colored pearlescent pigment were found.

According to the instant invention a polymer containing hydroxy groups is used as adhesion promotor. For example, polyvinyl alcohol ("PVA"), substituted PVA comprising amino or quaternary ammonium groups, the sulfonic or sulfonate group, the carboxylic or carboxylate group, cellulose derivatives, or polysaccharides as described e.g. in EP-A 278 633, preferred is PVA.

In a preferred embodiment of the instant invention a PVA is used having a degree of hydrolysis in the range of from 60 to 99, preferably from 80 to 95, particularly preferred from 85 to 90%, related to the corresponding polyvinylacetate.

Particularly preferred is a polyvinylalcohol with a molecular weight in the range of from not less than 10,000 g/mol, preferred from 10,000 to 200,000 g/mol, especially from 12,000 to 18,000 g/mol, and with a degree of hydrolysis in the range of from 85 to 90%. Such preferred PVA are known and commercially available e.g. as MOWIOL®3/83 from Lonza.

Preferably, the amount of the adhesion promotor is chosen in such a way that the ratio of deposited second pigment to pearlescent pigment is as high as possible. Usually, the optimum concentration depends mainly on the kind of chosen second pigment and can be easily found by simple experimentation. In general, the weight ratio of the adhesion polymer to the second pigment is chosen in the range of from 1 to 50, preferably from 10 to 40%.

As pearlescent pigments all known pearlescent pigments can be used. Such pearlescent pigments usually are based on metal-oxide coated flaky substrates, where such substrates can be based on complex oxides such as mica, talc or kaolin or glass, simple oxides such as Al- or Si-oxides or metals such as titanium. As micas synthetic as well as natural micas such as muscovite, phlogopite, or biotite can be used. The pearlescent pigments can be after-treated in different ways with well-known layers such as silica or alumina.

In general, metal-oxide coatings are made of iron(III) oxide, chromium(III)oxide, titanium(IV)oxide, zirconium (IV)oxide and tin(IV)oxide as well as mixtures thereof. The micas can be coated with one or with different metal-oxide coatings. The preparation of metal-oxide coated micas is well-known in the art.

Metal-oxide, preferably $TiO_2$-coated micas are also available commercially, e.g. as IRIODIN® (E.Merck, Darmstadt), FLONAC® (Kemira Oy, Pori, Finland) and MEARLIN® (The Mearl Corporation, New York).

The choice which pearlescent pigment to be combined with which second pigment usually depends on the desired coloristic and stability properties. Hence, a wide variety of coloristic effects can be obtained depending on the interplay between the interference of the pearlescent pigment and the absorption of the second pigment.

In a particularly preferred embodiment a $TiO_2$-coated mica is used as pearlescent pigment, whereby the interference color ranges usually from yellow over red and blue to green. The particle size of $TiO_2$-coated mica in general depends on the use, e.g. it can be chosen in the range of from 5 to 50 μm.

In another preferred embodiment the pearlescent pigment such as a $TiO_2$-coated mica is pretreated with a diluted mineral acid or the adhesion promotor, in a particularly preferred embodiment a such pretreated pearlescent pigment like a $TiO_2$-coated mica is used in combination with a PVA pretreated organic pigment as second pigment.

The pretreatment of the pearlescent pigment with a diluted mineral acid in general is carried out by suspending the pearlescent pigment in a diluted aqueous solution of a mineral acid, preferably with an acid concentration in the range of from 0.5 to 1N. Further, it is preferred to heat the suspension to a temperature in the range of from 15° C. or room temperature to the boiling temperature of the reaction mixture at ambient pressure, preferably from 90 to 100° C., if desired under pressure, preferably at ambient pressure, for 1 to 12, preferably for 5 to 7, particularly for 6 hours. After this treatment the treated pearlescent pigment usually is washed and dried, preferred in a usual manner, or, in another preferred embodiment, the treated pearlescent pigment can be used in the form of a presscake.

As mineral acids preferably all known strong mineral acids can be used such as sulfuric acid, sulfonic acid, nitric acid, or hydrochloric acid and phosphoric acid as well.

The pretreatment of the pearlescent pigment with the adhesion promotor usually is carried out by suspending the pearlescent pigment in an aqueous solution of a adhesion promotor for 0.5 to 24, preferably from 1 to 6 hours. After the treatment the thus treated pearlescent pigment usually is worked up in an usual manner, e.g. by filtering, washing and/or drying, preferred by filtering and washing, or used as a presscake.

Usually the weight ratio of adhesion promotor to pearlescent pigment is chosen in the range of from 0.1:1 to 10:1, preferably from 0.2:1 to 1:1.

In general, the reaction temperature is chosen in the range of from 15 to 90, preferably from room temperature to 50° C., while the reaction pressure preferably is at ambient pressure.

As second pigment of the inventive composition an inorganic or an organic pigment can be used, preferred is an organic pigment.

As organic pigment all known organic pigments can be used, e.g. azopigments like mono azo-, disazo-, naphthol-, benzimid-azolones-, azocondensation-, metal complex-, isoindolinone- and isoindoline-pigments, indigo, chinophthalon-pigments, dioxazine-pigments, as well as polycyclic pigments such as quinacridones, phthalocyanines, perylenes, perinones, and thioindigo, further, anthraquinone pigments such as aminoanthraquinones, hydroxyanthraquinones, anthrapyrimidines, indanthrones, flavanthrones, pyranthrones, anthanthrones, and isoviolanthrones, and diketopyrrolopyrrole-pigments.

The organic pigments can be after-treated in a manner well-known in the art.

Transparent, fine particle forms as well as large particle forms can be employed, depending on the desired coloristic properties.

In a preferred embodiment of the invention on hand, diketopyrrolopyrrole-pigments, quinacridones and phthalocyanines such as Cu-phthalocyanines are used, especially preferred are diketopyrrolopyrrole-pigments or quinacridones.

As a rule, the weight ratio of the second pigment to the pearlescent pigment is chosen in the range of from 1 to 20, preferably from 3 to 10%.

In another preferred embodiment of this invention the second pigment, particularly an organic pigment is pretreated with the adhesion promotor, particularly, if PVA is chosen as adhesion promotor.

Usually, this pretreatment is carried out by dispersing the second pigment, preferably used as press cake, in an aqueous solution of the adhesion promotor. In a preferred embodiment the dispersing step is carried out at a temperature in the range of from 15 to 50° C., particularly preferred at room temperature, with a conventional agitator such as an ultrasonic agitator, a high speed agitator, or a bead milling apparatus.

The weight ratio of the adhesion promotor to the second pigment as a rule depends mainly on the properties of the second pigment like e.g. the specific surface area. Preferably the weight ratio is chosen in the range of from 5 to 40, particularly preferred from 10 to 20%.

In a particularly preferred embodiment, the adhesion promotor is an aqueous solution of PVA with a concentration in the range of from 0.1 to 2% by weight, a molecular weight in the range of from 12,000 to 18,000 g.mol$^{-1}$ and a degree of hydrolysis in the range of from 85 to 90%.

If desired, the inventive colored pearlescent pigments can be submitted to additional treatments such as surface treatment by conventional manner in order to improve properties of it such as dispersibility, texture etc.

Hence, another preferred embodiment relates to the inventive colored pearlescent pigments whereby the second pigment and/or the pearlescent pigment contain the adhesion promotor on its surfaces.

Another embodiment of the instant invention relates to a process for the preparation of a colored pearlescent pigment characterized in mixing a suspension of a pearlescent pigment with a dispersion of a second pigment, where the pearlescent pigment and/or the second pigment is previously treated with an adhesion promotor, and wherein the pH of the suspension is chosen in the range of from not greater than 5. The pH of the suspension can be adjusted with diluted mineral acid or an appropriate buffer solution.

In a preferred embodiment of the inventive process the dispersion of the second pigment is added slowly, more preferred dropwise, to the suspension of the pearlescent pigment.

In another preferred embodiment of the inventive process, the reaction time is chosen in the range of from 1 to 6 hours.

In another preferred embodiment of the inventive process, the reaction temperature is chosen in the range of from 15 to 90, preferably from 20 to 50° C.

In a still further embodiment second pigments are used which are pretreated with the adhesion promotor, and pearlescent pigments are used which are pretreated with an acid.

In a particularly preferred embodiment of this invention an acid activated pearlescent pigment, preferably mica having a titanium dioxide layer, is used together with an PVA-treated pigment such as a diketopyrrolopyrrole-pigment or a quinacridone.

Another embodiment of the present invention is related to the use of the inventive colored pearlescent pigments as pigments for coloring high molecular weight organic materials, e.g. biopolymers, plastic materials, including fibres, glasses, ceramic products, for formulations in decorative cosmetics, for the preparation of inks, printing inks, paint systems, in particular automotive paints and dispersion colors.

Illustrative examples of suitable organic materials of high molecular weight which can be colored with the colored pearlescent pigments of this invention are vinyl polymers, for example polystyrene, poly-α-methylstyrene, poly-p-methylstyrene, poly-p-hydroxystyrene, poly-p-hydroxyphenylstyrene, polymethyl methacrylate and polyacrylamide as well as the corresponding methacrylic compounds, polymethylmaleate, polyacrylonitrile, polymethacrylonitrile, polyvinyl chloride, polyvinyl fluoride, polyvinylidene chloride, polyvinylidene fluoride, polyvinyl acetate, polymethyl vinyl ether and polybutyl vinyl ether; polymers which are derived from maleinimide and/or maleic anhydride, such as copolymers of maleic anhydride with styrene; polyvinyl pyrrolidone; ABS; ASA; polyamides; polyimides; polyamidimides; polysulfones; polyether sulfones; polyphenylene oxides; polyurethanes; polyureas; polycarbonates; polyarylenes; polyarylene sulfides; polyepoxides; polyolefins such as polyethylene and polypropylene; polyalkadienes; biopolymers and the derivatives thereof e.g. cellulose, cellulose ethers and esters such as ethylcellulose, nitrocellulose, cellulose acetate and cellulose butyrate, starch, chitin, chitosan, gelatin, zein; natural resins; synthetic resins such as alkyd resins, acrylic resins, phenolic resins, epoxide resins, aminoformaldehyde resins such as urea/formaldehyde resins and melamine/formaldehyde resin; vulcanized rubber; casein; silicone and silicone resins; rubber, chlorinated rubber; and also polymers which are used, for example, as binders in paint systems, such as novolaks which are derived from $C_1$–$C_6$-aldehydes such as formaldehyde and acetaldehyde and a binuclear or mononuclear, preferably mononuclear, phenol which, if desired, is substituted by one or two $C_1$–$C_9$alkyl groups, one or two halogen atoms or one phenyl ring, such as o-, m- or p-cresol, xylene, p-tert-butylphenol, o-, m- or p-nonylphenol, p-chlorophenol or p-phenylphenol, or a compound having more than one phenolic group such as resorcinol, bis(4-hydroxyphenyl)methane or 2,2-bis(4-hydroxyphenyl)propane; as well as suitable mixtures of said materials.

Particularly preferred high molecular weight organic materials, in particular for the preparation of a paint system, a printing ink or ink, are, for example, cellulose ethers and esters, e.g. ethylcellulose, nitrocellulose, cellulose acetate and cellulose butyrate, natural resins or synthetic resins (polymerization or condensation resins) such as aminoplasts, in particular urea/formaldehyde and melamine/formaldehyde resins, alkyd resins, phenolic plastics, polycarbonates, polyolefins, polystyrene, polyvinyl chloride, polyamides, polyurethanes, polyester, ABS, ASA, polyphenylene oxides, vulcanized rubber, casein, silicone and silicone resins as well as their possible mixtures with one another.

It is also possible to use high molecular weight organic materials in dissolved form as film formers, for example boiled linseed oil, nitrocellulose, alkyd resins, phenolic resins, melamine/formaldehyde and urea/formaldehyde resins as well as acrylic resins.

Said high molecular weight organic compounds may be obtained singly or in admixture, for example in the form of granules, plastic materials, melts or in the form of solutions, in particular for the preparation of spinning solutions, paint systems, coating materials, inks or printing inks.

In a particularly preferred embodiment of this invention, the novel colored pearlescent pigments are used for the mass coloration of polyvinyl chloride, polyamides and, especially, polyolefins such as polyethylene and polypropylene as well as for the preparation of paint systems, including powder coatings, inks, printing inks and coating colors.

Illustrative examples of preferred binders for paint systems are alkyd/melamine resin paints, acryl/melamine resin paints, cellulose acetate/cellulose butyrate paints and two-pack system lacquers based on acrylic resins which are crosslinkable with polyisocyanate.

According to observations made to date, the novel colored pearlescent pigments can be added in any desired amount to the material to be colored, depending on the end use requirements. In the case of high molecular weight organic materials, for example, the pigments composed according to this invention can be used in an amount in the range from 0.01 to 40, preferably from 0.1 to 20% by weight, based on the total weight of the colored high molecular weight organic material.

The pigmenting of the high molecular weight organic materials with the novel colored pearlescent pigments is usually effected by incorporating said novel colored pearlescent pigments, if desired in the form of masterbatches, in the high molecular weight organic materials using customary apparatus suitable to this end, such as extruders, roll mills, mixing or milling apparatus. The material thus treated is then normally brought into the desired final form by methods which are known per se, such as calandering, molding, extrusion molding, coating, casting, extruding, or by injection molding, wherein—if desired—necessary steps have to be taken not to destroy the inventive pigments.

To produce non-brittle moldings or to diminish their brittleness, so-called plasticizers can be added to the high molecular weight substances prior to molding. Plasticizers may be, for example, esters of phosphoric acid, phthalic acid and sebacic acid. Said plasticizers may be added before, during or after pigmenting the high molecular weight substances with the colored pearlescent pigments of this invention.

For the preparation of paints systems, coating materials, inks and printing inks, the corresponding high molecular weight organic substances, such as binders, synthetic resin dispersions etc. and the novel colored pearlescent pigments are usually dispersed or dissolved together, if desired together with customary additives such as fillers, paint auxiliaries, siccatives, plasticizers and/or additional pigments, in a common solvent or mixture of solvents. This can be achieved by dispersing or dissolving the individual components by themselves, or also several components together, and only then bringing all components together, or by adding everything together at once. The manufacturing then generally is carried out according to well-known methods such as spraying, film drawing, or one of the many printing methods, whereupon the paint system or the printing ink, if desired after a previous drying step, usually is cured thermally or by irradiation.

For application in printing, all customary industrial printing processes can be employed, such as screen printing, rotogravure, bronze printing, flexographic printing and offset printing.

To obtain different shades, the novel colored pearlescent pigments may advantageously be used in admixture with fillers, transparent and opaque white, colored and/or black pigments as well as customary luster pigments such as e.g. pigments based on mica or metallic flakes in the desired amount.

Hence, another embodiment of this invention relates to a colored high molecular weight organic material comprising the inventive colored pearlescent pigment. The inventive colored pearlescent pigments exhibit an improved adhesion between pigment/dye and substrate compared to known pigments compositions, resulting in intensely colored pearlescent pigments with excellent stabilities. Further, the inventive is not complicated and easy to handle even on a commercial scale.

EXAMPLES

Preparation of Pigment Dispersion 6.3 g of pigment is added to 200 ml of an aqueous solution of 0.625 wt.-% or 1.35 wt.-% polyvinyl alcohol (PVA, $M_w$: 15,000 g/mol, hydration ratio: 86 to 89%). Then, the pigment is dispersed with an ultrasonic agitator (SONIFIER®B-12, Branson Sonic Power Comp.) until no pigment agglomerates are observed under an optical microscope at magnitude of 400 times.

The following Table shows the obtained pigment dispersions.

| Dispersion | Pigment | PVA (wt. -%) | PVA/Pigment (%) |
|---|---|---|---|
| A | IRGAZIN DPP RUBINE TR ®[1] | 0.625 | 20 |
| B | IRGAZIN DPP RED BTR ®[1] | 0.625 | 20 |
| C | IRGAZIN DPP RED BTR ®[1] | 1.35 | 40 |
| D | IRGAZIN DPP RED BO ®[1] | 0.625 | 20 |
| E | CINQUASIA MAGENTA B RT-343D ®[1] | 0.625 | 20 |
| F | CROMOPHTAL YELLOW 2RLTS ®[1] | 0.625 | 20 |
| G | IRGAZIN YELLOW 5GT ®[1] | 0.625 | 20 |
| H | PALIOTOL YELLOW 2140HD ®[2] | 0.625 | 20 |

[1]available from Ciba Specialty Chemicals, Basel, CH
[2]available from BASF AG, Ludwigshafen, DE Acid Activation of Pearlescent Pigment A suspension of 100 g of IRIODIN®211 or 221 or 231 (from Merck, Darmstadt) in 400 ml of 0.5 mol/l $H_2SO_4$ aqueous solution is heated up to 95° C. and kept at this temperature for 5 hours. After cooling to room temperature, the such treated ("activated") pearlescent pigment is collected by filtration with a cloth filter. The filtered activated pearlescent pigment is then dispersed in 500 ml of deionized water and stirred for 5 minutes. The obtained dispersion is filtered with a cloth filter. The residue is washed three times in the same manner. Afterwards, the washed pearlescent pigment is dried under reduced pressure (17.3 kPa (130 mm Hg); 70° C.).

Yield: at least 90 g, depending on the IRIODIN® used.

PVA Treatment of the Pearlescent Pigment 20 g of IRIODIN®221 are suspended in 500 ml of a 1 wt.-% PVA (same as described above) aqueous solution. The suspension is conditioned for 1 hour with stirring. Then, the thus treated pearlescent pigment is collected by filtration with a cloth filter. The collected, treated pearlescent pigment is washed in 200 ml of deionized water, filtered on a cloth filter, and then finally dried under reduced pressure (17.3 kPa (130 mm Hg); 70° C.).

Example 1

25 g of acid activated IRIODIN®211 are suspended in 500 ml of deionized water with mechanical stirring, pH=4. To this suspension, 80 g of the above prepared dispersion A are added dropwise at amount of 15 ml per hour with a pump. After the addition, free pigment particles, which are now fixed on the pearlescent pigment, are washed off by decantation two times. The coloured pearlescent pigment is collected by filtration with a cloth filter. The coloured pearlescent pigment is collected by filtration with a cloth filter. The coloured pearlescent pigment is washed in 500 ml of deionized water, and then is collected by filtration with the clothe filter. The coloured pearlescent pigment is dried under a redued pressure (17.3 kPa (130 mm Hg); 70° C.). The coloured pearlescent pigment thus obtained is red in its appearance with showing red interference colour.

Yield: 23.6 g. Carbon content (determined by elemental analysis): 8.6 wt.-%.

Comparative Example 1

The procedure of Example 1 is repeated except that non-activated IRIODIN®211 is used. The suspension shows in this case a pH of ca. 9.0. The coloured pearlescent pigment obtained is pink in its appearance.

Yield: 20.7 g. Carbon content (determined by elemental analysis): 2.1 wt.-%.

Example 2

50 g of acid activated IRIODIN®221 are suspended in 100 ml of deionized water with mechanical stirring. The suspension shows a pH of ca.4. To this suspensio 160 g of the dispersion B is added dropwise in the rate of 25 ml per hour with a pump. During this addition, both the suspension and the dispersion are stirred. After the addition, free pigment particles, which are not fixed on the pearlescent pigment, are washed off by decantation two times. The coloured pearlescent pigment is collected by filtration with a cloth filter. The obtained coloured pearlescent pigment is washed in 1000 ml of deionized water, and then is collected by filtration with a cloth filter. Afterwards the coloured pearlescent pigment is dried under a reduced pressure (17.3 kPa (130 mm Hg); 70° C.). The dried coloured pearlescent pigment thus obtained is red in its appearance with showing blue interference colour.

Yield: 54.7 g. Carbon content (determined by elemental analysis): 9.3 wt.-%.

Example 3

The procedure used in Example 2 is repeated except that the acid activated IRIODIN®231 was used. The coloured pearlescent pigment obtained is red in its appearance with showing green interference colour.

Yield: 50.6 g. Carbon content (determined by elemental analysis): 6.5 wt.-%.

Example 4

The procedure used in Example 2 is repeated except that the activated IRIODIN®211 and the dispersion C are used. The coloured pearlescent pigment obtained is red in its appearance with showing red interference colour.

Yield: 41.8 g. Carbon content (determined by elemental analysis): 4.4 wt.-%.

Example 5

The procedure used in Example 2 is repeated except that the activated IRIODIN®221 and the dispersion C are used. The coloured pearlescent pigment obtained is red in its appearance with showing blue interference colour.

Yield: 46.0 g. Carbon content (determined by elemental analysis): 3.5 wt.-%.

Comparative Experiment 2

The procedure used in Example 5 is repeated except that the experimental batch size is reduced by one fifth and that pH of the suspension was adjusted to 12 with aliquot of 1 mol/l KOH aqueous solution. The coloured pearlescent pigment obtained is pink in its appearance with showing red interference colour.

Yield: 9.4 g. Carbon content (determined by elemental analysis): 0.96 wt.-%.

Example 6

The procedure used in Example 2 is repeated except that the activated IRIODIN®231 and the dispersion C are used. The coloured pearlescent pigment obtained is red in its appearance with showing red interference colour.

Yield: 45.6 g. Carbon content (determined by elemental analysis): 3.8 wt.-%.

Example 7

The procedure used in Example 4 is repeated except that the dispersion B is used and that the experimental batch size is reduced by one fifth. The coloured pearlescent pigment obtained is red in its appearance with showing red interference colour.

Yield: 9.2 g. Carbon content (determined by elemental analysis): 4.0 wt.-%.

Example 8

The procedure used in Example 7 is repeated except that non-activated IRIODIN®221 is suspended in a phthalate buffer (50 mmol/l potassium hydrogen phthalate, pH=4.0). The coloured pearlescent pigment obtained is red in its appearance with showing blue interference colour.

Yield: 9.3 g. Carbon content (determined by elemental analysis): 3.0 wt.-%.

Example 9

The procedure used in Example 8 is repeated except that the PVA treated IRIODIN®221 is used. The coloured pearlescent pigment obtained is red in its appearance with showing blue interference colour.

Yield: 8.8 g. Carbon content (determined by elemental analysis): 3.0 wt.-%.

Example 10

The procedure used in Example 8 is repeated except that the dispersion A is used. The coloured pearlescent pigment obtained is red in its appearance with showing blue interference colour.

Yield: 9.8 g. Carbon content (determined by elemental analysis): 4.1 wt.-%.

Example 11

The procedure used in Example 7 is repeated except that the dispersion D is used. The coloured pearlescent pigment obtained is red in its appearance with showing blue interference colour.

Yield: 9.7 g. Carbon content (determined by elemental analysis): 7.1 wt.-%.

Example 12

The procedure used in Example 11 is repeated except that non-activated IRIODIN®221 is suspended in a phthalate buffer (50 mmol/l potassium hydrogen phthalate, pH=4.0). The coloured pearlescent pigment obtained is red in its appearance with showing blue interference colour.

Yield: 9.5 g. Carbon content (determined by elemental analysis): 2.8 wt.-%.

Example 13

The procedure used in Example 12 is repeated except that non-activated IRIODIN®221 is suspended in deionized water and pH of the suspension is adjusted to 4.0 with hydrochloric acid. The coloured pearlescent pigment obtained is red in its appearance with showing blue interference colour.

Yield: 9.6 g. Carbon content (determined by elemental analysis): 6.7 wt.-%.

Example 14

The procedure used in Example 12 is repeated except that non-activated IRIODIN®221 is suspended in 0.1 mol/l aqueous solution of NaCl and pH of the suspension is adjusted to 3.3 with hydrochloric acid. The coloured pearlescent pigment obtained is red in its appearance with showing blue interference colour.

Yield: 9.3 g. Carbon content (determined by elemental analysis): 3.5 wt.-%.

Example 15

The procedure used in Example 12 is repeated except that non-activated IRIODIN®221 is suspended in 0.1 mol/l aqueous solution of $MgCl_2$ and pH of the suspension is adjusted to 3.4 with hydrochloric acid. The coloured pearlescent pigment obtained is red in its appearance with showing blue interference colour.

Yield: 9.5 g. Carbon content (determined by elemental analysis): 3.1 wt.-%.

Example 16

The procedure used in Example 7 is repeated except that the dispersion E is used. The coloured pearlescent pigment obtained is yellow in its appearance with showing blue interference colour.

Yield: 9.4 g. Carbon content (determined by elemental analysis): 2.2 wt.-%.

Example 17

The procedure used in Example 8 is repeated except that the dispersion E is used. The coloured pearlescent pigment obtained is yellow in its appearance with showing blue interference colour.

Yield: 9.5 g. Carbon content (determined by elemental analysis): 1.9 wt.-%.

Example 18

The procedure used in Example 7 is repeated except that the dispersion F is used. The coloured pearlescent pigment obtained is magenta in its appearance with showing blue interference colour.

Yield: 9.4 g. Carbon content (determined by elemental analysis): 5.4 wt.-%.

Example 19

The procedure used in Example 8 is repeated except that the dispersion F is used. The coloured pearlescent pigment obtained is magenta in its appearance with showing blue interference colour.

Yield: 9.5 g. Carbon content (determined by elemental analysis): 2.9 wt.-%.

Example 20

The procedure used in Example 7 is repeated except that the dispersion G is used. The coloured pearlescent pigment obtained is yellow in its appearance with showing blue interference colour.

Yield: 9.7 g. Carbon content (determined by elemental analysis): 4.0 wt.-%.

Example 21

The procedure used in Example 8 is repeated except that the dispersion G is used. The coloured pearlescent pigment obtained is yellow in its appearance with showing blue interference colour.

Yield: 9.4 g. Carbon content (determined by elemental analysis): 3.4 wt.-%.

Example 22

The procedure used in Example 7 is repeated except that the dispersion H is used. The coloured pearlescent pigment obtained is yellow in its appearance with showing blue interference colour.

Yield: 9.4 g. Carbon content (determined by elemental analysis): 4.8 wt.-%.

Example 23

The procedure used in Example 8 is repeated except that the dispersion H is used. The coloured pearlescent pigment obtained is yellow in its appearance with showing blue interference colour.

Yield: 9.6 g. Carbon content (determined by elemental analysis): 4.2 wt.-%.

Application in Plasticized PVC 0.4 g of pigment are blended with 13.3 g of polyvinylchloride (PVC Evipol® SH 7020, EVC GmbH, Frakfurt a.M.) and 7.3 ml of a mixture consisting of 92.21% (w/w) diisodecylphthalat (Vestinol®, Hüls Chemie), 3.6% b.w. heatstabilizer Irgastab® BZ 561, Ciba Specialty Chemicals) and 4.19% b.w. epoxydized soy bean oil (Rheoplast® 39, Ciba Specialty Chemicals). After a wetting time of 30 minutes the mixture is transformed into a thin foil is on a 2-roll calendar at 165° C. during 8 minutes. Strongly colored foils with the following results are obtained:

| Example No. | Pigment of Example | Color | interference color |
|---|---|---|---|
| 24 | 1 | intense red | red |
| 25 | 2 | magenta | blue |
| 26 | 3 | greenish scarlet | green |
| 27 | 4 | red | red |
| 28 | 5 | intense pink | blue |
| 29 | 8 | red | blue |
| 30 | 9 | red | blue |
| 31 | 10 | strong bluish red | blue |

What is claimed is:

1. Colored pearlescent pigment comprising a pearlescent pigment, a second pigment, and an adhesion promoter whereby the adhesion promotor is a polyvinylalcohol and whereby the second pigment contains the adhesion promoter on its surface, and whereby the pearlescent pigment is either pretreated with a diluted mineral acid or contains the adhesion promoter on its surface, and whereby the second pigment is selected from the group consisting of mono azo-, disazo-, naphthol-, benzimid-azolones, azocondensation-, metal complex-, isoindolinone-, isoindoline pigments, indigo, chinophthalon-pigments, dioxazine-pigments, quinacridones, phthalocyanines, perylenes, perinones, thioindigo, aminoanthraquinones, hydroxyanthraquinones, anthrapyrimidines, indanthrones, flavanthrones, pyranthrones, anthanthrones, isoviolanthrones, and diketopyrrolopyrrole-pigments.

2. Colored pearlescent pigment according to claim 1, whereby the second pigment is a diketopyrrolopyrrole-pigment or a quinacridone or a phthalocyanine.

3. Colored pearlescent pigment according to claim 1, whereby the second pigment is a diketopyrrolopyrrole-pigment or a quinacridone or a phthalocyanine, and the pearlescent pigment is pretreated with a diluted mineral acid.

4. Process for the preparation of a colored pearlescent pigment, comprising mixing a suspension of a pearlescent pigment with a dispersion of a second pigment, where the pearlescent pigment and/or the second pigment is previously treated with an adhesion promoter, and wherein the pH of the suspension is in the range of from 0 to not greater than 5 to produce a colored pearlescent pigment according to claim 1.

5. Colored high molecular weight organic materials comprising a mixture of a colored pearlescent pigment according to claim 1 and a high molecular weight organic material.

6. A method for coloring high molecular weight organic material comprising incorporating a colored pearlescent pigment according to claim 1 into said high molecular weight organic material.

7. A method according to claim 6 wherein the high molecular weight organic material is selected from the group consisting of a biopolymer, fibers, glass, ceramics and mixtures thereof.

8. A method for preparing a cosmetic composition comprising incorporating a colored pearlescent pigment according to claim 1 into a cosmetic carrier.

9. A method for preparing a coloring system comprising incorporating a colored pearlescent pigment according to claim 1 into an ink or paint carrier system.

10. A method according to claim 9 wherein the coloring system is an automotive paint.

* * * * *